United States Patent [19]

Miura

[11] 4,365,443
[45] Dec. 28, 1982

[54] DOOR FOR AN AUTOMOTIVE VEHICLE

[75] Inventor: Eiichi Miura, Kamakura, Japan

[73] Assignee: Nissan Motor Company, Limited, Yokohama, Japan

[21] Appl. No.: 156,305

[22] Filed: Jun. 4, 1980

[30] Foreign Application Priority Data

Jun. 4, 1979 [JP] Japan .................................. 54-69668

[51] Int. Cl.³ .............................................. B60J 5/04
[52] U.S. Cl. ........................................ 49/502; 52/716; 49/501
[58] Field of Search .......................... 49/479, 501, 502; 52/716, 208

[56] References Cited

U.S. PATENT DOCUMENTS

| | | |
|---|---|---|
| 2,556,775 | 6/1951 | Oswald . |
| 2,794,221 | 6/1957 | Bedics .................................... 49/479 |
| 3,155,422 | 11/1964 | Campbell et al. ................. 52/208 X |
| 3,744,201 | 7/1973 | Dochnahl . |
| 4,248,933 | 2/1981 | Katoh .............................. 52/716 X |

FOREIGN PATENT DOCUMENTS 51-1912 1/1976 Japan .
877294 9/1961 United Kingdom .................. 49/501

OTHER PUBLICATIONS

"Corrosion Science and Corrosion Protection Technology" by Goro Ito, published on Feb. 28, 1969.

Primary Examiner—Kenneth Downey
Attorney, Agent, or Firm—Thompson, Birch, Gauthier & Samuels

[57] ABSTRACT

A door for an automotive vehicle includes a door panel, a door sash fixed thereto, a door sash moulding fitted to the door sash, and a non-metallic resilient material interposed between the door sash and the door sash moulding. Such a resilient material can be a plurality of pieces which are preferably placed at a corner, intermediate and end portions of the door sash, separately. Also, it is preferable that the piece placed at the corner of the door sash has a slit for facilitating the angular adjustment of the piece so as to correspond to the configuration of the corner of the door sash.

8 Claims, 19 Drawing Figures

DOOR FOR AN AUTOMOTIVE VEHICLE

BACKGROUND OF THE INVENTION

The present invention relates to a door for an automotive vehicle with which a door sash moulding is provided.

A door sash moulding is provided on the outer side of a door sash for the decoration purpose. FIGS. 1 and 3 show a door sash moulding 2 of such a type that it covers the whole part of the outer side of a door sash 1, which will be referred to as a "full moulding" hereinafter. FIGS. 2 and 4 show a further door sash moulding 3 of such a type that it covers a half of the outer side of the door sash 1, which will be referred to as a "half moulding" hereinafter.

Both of the door sash mouldings 2, 3 are directly attached on the door sash 1. For example, as best shown in FIG. 3, the full moulding 2 is fixed through its bent holding portions 4 on the door sash 1. As shown in FIG. 4, the half moulding 3 is fixed through its bent holding portion 5 on the door sash 1. Thus, there is nothing interposed between the door sash 1 and the door sash mouldings 2 or 3. In such structures, the door sash mouldings 2 or 3 are apt to damage a coating on the outer surface of the door sash 1 when they are assembled. This causes the door sash 1 to be rusted. In particular, such damages often occur at the outer edge and/or attaching portions of the door sash mouldings 2, 3 as shown by the circle A in FIGS. 3 and 4 which are conspicuous, and when rusted, adversely affect the appearance of the vehicle. Even if no damage occurs on the outer surface of the door sash 1, fine pin holes are apt to be produced on the surface of the door sash when it is coated. In addition, the door sash 1 and the door sash moulding 2 or 3 are made of different metals. For example, the door sash 1 is made of iron and the door sash mouldings 2, 3 are made of stainless steel or aluminium. Therefore, if they are in intimate contact with each other, then some electrolytic corrosion occurs due to the potential difference therebetween.

FIGS. 5 and 6 show another conventional structure for arranging a door sash moulding for an automotive vehicle. Non-metallic tape 6 is wound around an end of the sash moulding 3 at a corner Ca of the door sash 1 in order to prevent the surface of the door sash 1 from being damaged by the end of the door sash moulding when it is attached. However, this type of structure is not sufficiently effective to avoid completely the rusting of the door sash and/or the door sash mouldings.

SUMMARY OF THE INVENTION

An object of the present invention is to provide a structure for fitting a door sash moulding to a door sash for an automotive vehicle in which the surface of the door sash can be prevented from being damaged by the door sash moulding when they are assembled.

Another object of the present invention is to provide a door for an automotive vehicle including a door sash and a door sash moulding made of different metals in which no electrolytic corrosion occurs thereby to prevent the door sash from rusting due to the contact of the different materials.

According to the present invention, a door for an automotive vehicle includes a door sash, a door sash moulding fitted to the door sash, and a non-metallic resilient material interposed between the door sash and the door sash moulding. Such a resilient material can be composed of plural pieces which are placed at a corner, intermediate and end portions of the door sash, separately. Also, it is preferable that the piece placed at the corner of the door sash has a slit for facilitating the angular adjustment of the piece so as to correspond to the configuration of the corner of the door sash.

BRIEF DESCRIPTION OF THE DRAWINGS

FIG. 9 is a side view showing a corner of the door sash which the corner piece shown in FIG. 8 is fitted to;

FIG. 12 is a side view showing a corner of the door sash which the corner piece shown in FIG. 11 is fitted on;

DETAILED DESCRIPTION OF THE PREFERRED EMBODIMENT

Figure 1:
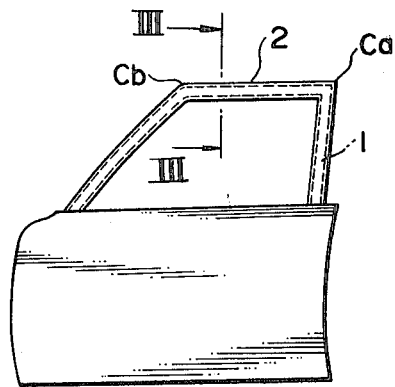
FIG. 1 is a side view showing a conventional door fitted with a door sash moulding and a door sash for an automotive vehicle.
Figure 2:
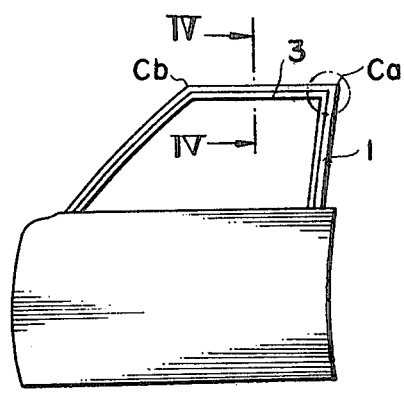
FIG. 2 is a side view showing another door fitted with a door sash moulding and a door sash for an automotive vehicle.
Figure 3:
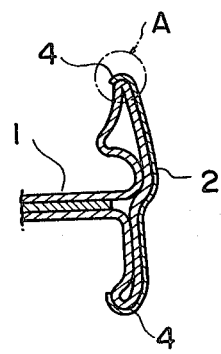
FIG. 3 is a sectional view taken along the line III—III in FIG. 1.
Figure 4:
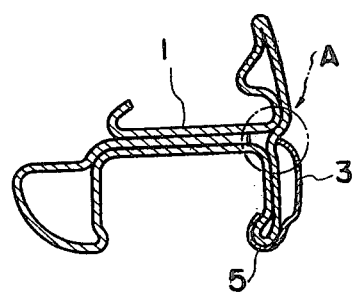
FIG. 4 is a sectional view taken along the line IV—IV in FIG. 2.
Figure 5:
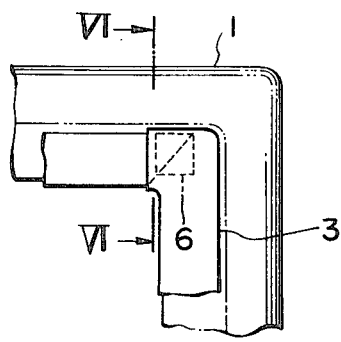
FIG. 5 is an enlarged view of the part encircled by the reference V in FIG. 2.
Figure 6:
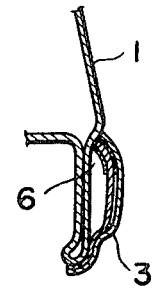
FIG. 6 is a sectional view taken along the line VI—VI in FIG. 5.
Figure 7:
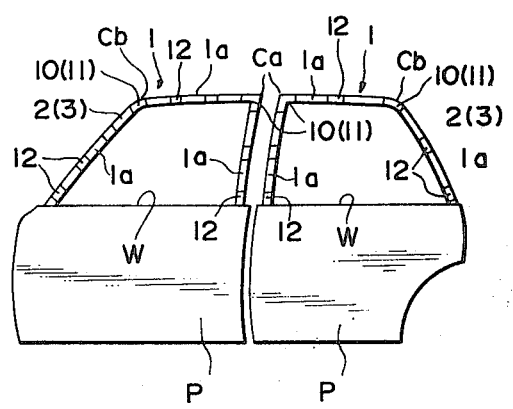
FIG. 7 is a schematic side view showing a pair of doors equipped with a structure for fitting a door sash moulding to a door sash according to a preferred embodiment of the present invention.

Referring now to FIG. 7, a door for an automotive vehicle includes a door panel p, door sash 1, door sash mouldings 2, 3, corner pieces 10, 11 and protector pieces 12. The door sash 1 is fixed to the door panel p so as to receive a glass in a conventional manner. The corner pieces 10, 11 are placed at the corners Ca, Cb of the door sash 1. The protector pieces 12 are positioned at the end and/or intermediate portions (that is, general portions 1a) of the door sash 1. The corner pieces 10, 11 and the protector pieces 12 are preferably made of a non-metallic material having a desired elasticity and hardness such as a synthetic resin. Those pieces 10, 11, 12 are also interposed between the outer surface of the door sash 1 and the door sash moulding 2 or 3.

Figure 8:
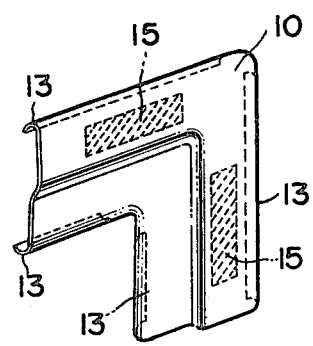
FIG. 8 is a perspective view showing an example of a corner piece for use in the fitting structure shown in FIG. 7.
Figure 9:
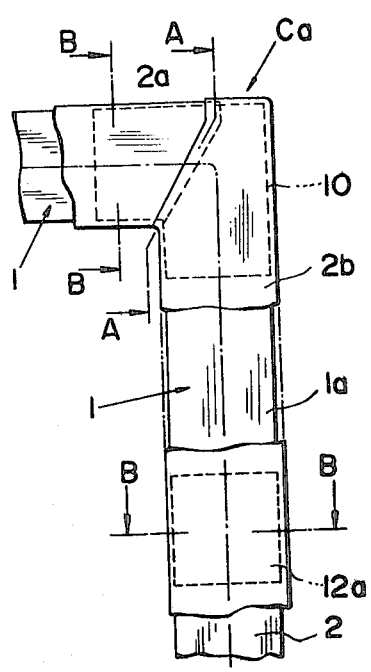
Figure 10A:
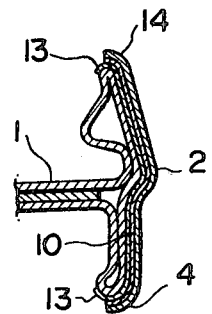
FIG. 10A is a sectional view taken along the line A—A in FIG. 9.
Figure 10B:
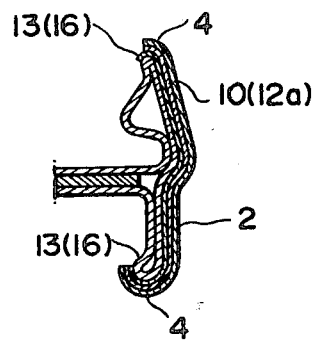
FIG. 10B is a sectional view taken along the line B—B in FIG. 9.

FIGS. 8 through 10 illustrate a preferred form of the corner piece 10 suitable for use in a full moulding. The configuration of the corner piece 10 in section corresponds to the outer surface of the door sash 1 as best shown in FIGS. 10A and 10B. The outline of the corner piece 10 corresponds to that of the corner Ca (or Cb) of the door sash 1 as best shown in FIG. 9. For example, the corner Ca forms a right angle, and thus the corner piece 10 is in a L-shape. The corner piece 10 is fixedly attached through its holding portion 13 to the door sash 1. Such a holding portion 13 is formed at each edge of the corner piece 10 by bending it. The holding portion 13 at the inner edge of the corner piece 10 can be omitted.

Figure 11:
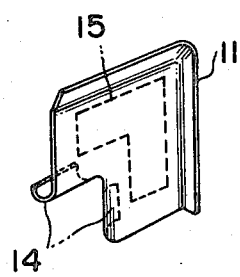
FIG. 11 is a perspective view showing a further corner piece for use in a fitting structure according to the present invention.
Figure 12:
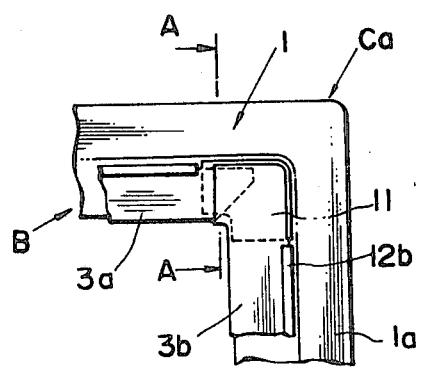
Figure 13:
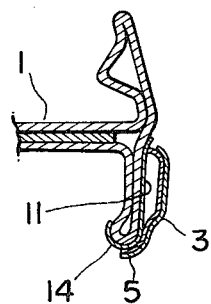
FIG. 13 is a sectional view taken along the line A—A in FIG. 12.

FIGS. 11 through 13 illustrate a preferred form of the corner piece 11 suitable for use in a half moulding. The configuration in section of the corner piece 11 corresponds to the inner half of the outer surface of the door sash 1. Also, the outline of the corner piece 11 corresponds to that of the corner Ca (or Cb) of the door sash 1 at best shown in FIG. 12. The corner piece 11 has a holding portion 14 at its inner edge for fixedly holding the inner edge of the door sash 1 by bending it inwardly.

It is convenient that the corner pieces 10, 11 are attached to the door sash 1 in their assembling. They can be also fixed to the door sash mouldings 2, 3 before being fitted to the door sash 1.

Usually, the perpendicular corner portion Ca of the door sash moulding 2, 3 can not be continuously rolled unlike the generously curved corner portion Cb thereof. Therefore, as shown in FIGS. 9 and 12, they are divided or separated at such a connecting point into two pieces 2a, 2b and 3a, 3b, respectively. The corresponding ends of those pieces 2a, 2b, 3a, 3b overlap each other. In such a case, the corner pieces 10, 11 should be attached provisionally to one end of the inner piece of the door sash moulding.

It is preferable that a desired adhesive material is additionally used to ensure the attachment of the corner pieces onto the door sash. For example, an adhesive tape 15 or an adhesive can be provided on the backside of the corner pieces 10, 11.

The protector pieces 12 can be placed on the whole part of the door sash 1 excluding the corner portions Ca, Cb, but in order to conserve material, they are attached preferably to only selected portions, as shown in FIG. 7. If the door sash moulding 2, 3 can be prevented from contacting the outer surface of the door sash 1, then the protector piece 12 can be arranged only near the west portion W of the door in FIG. 7.

As shown in FIGS. 9 and 10B, a protector piece 12a for use in a full moulding has a configuration in section so as to correspond to the outer surface of the general portion 1a of the door sash 1 and at its one or both edges a holding portion 16 for fixedly holding the door sash 1 by bending it inwardly. When the door sash moulding 2 is attached to the door sash 1, the protector pieces 12a are provisionally fixed onto the door sash moulding 2 or the door sash 1. In this case, some adhesive material can be used to improve the fitting of the protector pieces 12 onto the door sash 1 or the door sash moulding 2.

Figure 14:
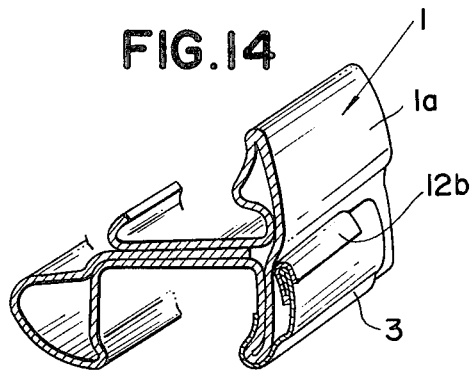
FIG. 14 is a perspective view, partly in section, as viewed from the arrow B in FIG. 12 with the parts being omitted for clarility.

As shown in FIGS. 12 and 14, a corner or protector piece 12b for use in a half moulding can be fitted only to the upper edge of the sash moulding 3 so as to prevent the door sash moulding 3 from contacting the outer surface of the door sash 1 if the protector piece 12b is formed in a U-shape section. In operation, the protector pieces 12b are attached to the door sash moulding 3 before the door sash moulding 3 is fitted to the door sash 1.

Figure 15A:
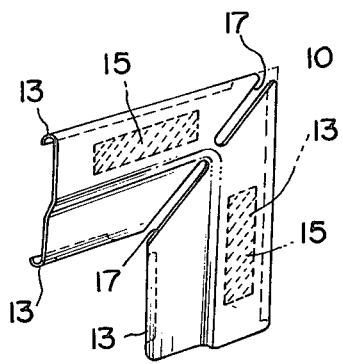
FIGS. 15A, 15B and 15C show still further corner pieces according present invention, respectively.
Figure 15B:
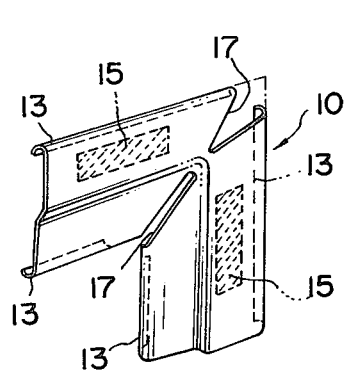
Figure 15C:
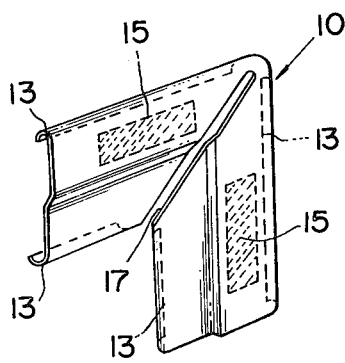
Figure 16:
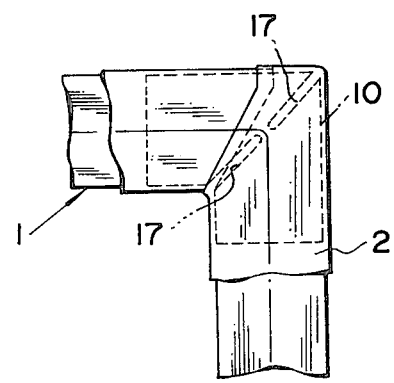
FIG. 16 is a side view showing a corner of the door sash on which the corner piece shown in FIG. 15A is fitted.
Figure 17C:
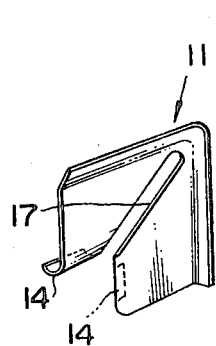
FIGS. 17A, 17B and 17C show another corner pieces according to the present invention, respectively.
Figure 17B:
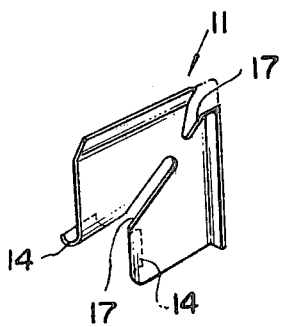
Figure 17A:
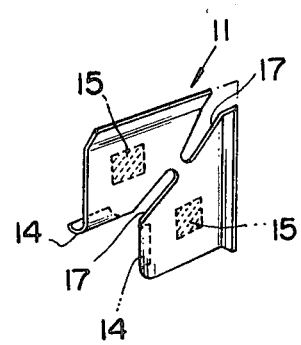
Figure 18:
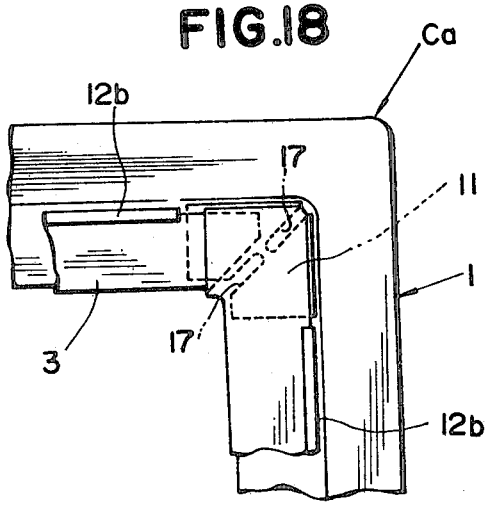
FIG. 18 is a side view showing a corner of the door sash on which the corner piece shown in FIG. 17A is fitted.

FIGS. 15 and 16 illustrate other forms of the corner piece 10 according to the present invention. FIGS. 17 and 18 illustrate other forms of the corner piece 11. In these embodiments, a slit or slits 17 are formed along the line between the outer corner of the corner piece and the inner corner thereof thereby to facilitate the angular adjustment of the corner piece so as to correspond to any configuration of the corner portion of a different door sash. As shown in FIGS. 15A and 17A, the slit 17 can be formed in a deep U-shape, and two slits 17 are arranged from the outer and inner corners of the corner pieces 10 and 11 almost to the mid point thereof. Also, the slit 17 can be formed in a V-shape as shown in FIGS. 15B and 17B, or in a U-shape but only from the inner corner of the corner piece to near the outer corner thereof so as to facilitate the angular adjustment of the corner piece.

According to those shown embodiments, one type corner piece can be applied to various corner portions Ca, Cb of the door sash 1 so that it is beneficial in its manufacture and assembly.

The corner pieces 10, 11 can be arranged in a limited area of the corner portion of the door sash 1. For example, as shown in FIGS. 19A and 19B, the corner pieces 10 and 11 can be formed in a rectangle so as to cover only a very small area of the corner portions Ca, Cb.

Figure 19B:
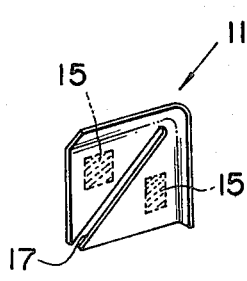
FIGS. 19A and 19B show still another corner pieces according to the present invention, respectively.
Figure 19A:
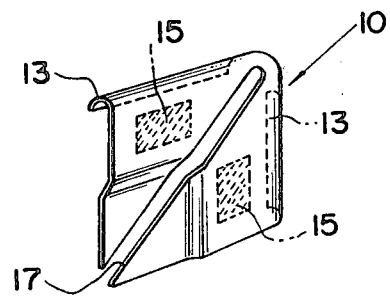

As shown in FIG. 19B, it is possible to omit the holding portion 14 at the inner edge of the corner piece 11 by providing an adhesive tape 15 on the backside of the corner piece 11.

As can be seen from the foregoing, according to the present invention, a corner piece and a protector piece made of non-metallic material is interposed between a door sash and a door sash moulding for its protection so that the door sash moulding can be prevented from contacting the door sash directly. Thus, the coating on the door sash is never damaged by the door sash moulding. In addition, no electrolytic corrosion occurs thereby to prevent the door sash from rusting due to the contact of the different metals.

What is claimed is:

1. A door for an automotive vehicle, comprising:
a door panel positioned at the lower portion of the door;
a door sash fixed to the door panel so as to receive a glass therein;
a door sash moulding overlying the outer surface of the door sash for protecting the door sash; and
a non-metallic resilient material interposed between the door sash and the door sash moulding so as to prevent the door sash moulding from directly contacting the door sash, the door sash and the door sash moulding being made of different metals, the resilient material being separated into a plurality of pieces which are provided at the corners, ends, and intermediate portions of the door sash, each of the pieces at the corners being formed as one body and being curved along the outline of the corner so that each corner piece extends along two adjacent side portions of the door sash at the corner thereof.

2. A door of claim 1, wherein the pieces are fixed to either of the door sash or the door sash moulding.

3. A door of claim 2, wherein the pieces are fixed by mechanical means.

4. A door of claim 2, wherein the pieces are fixed by an adhesive material.

5. A door of claim 1, wherein the corner piece positioned at a corner of the door sash has a slit for facilitating the angular adjustment of the corner piece so as to correspond to the configuration of the corner of the door sash.

6. A door of claim 5, wherein the slit is formed along the line between the inner and outer corners of the corner piece.

7. A door of claim 6, wherein the slit is formed in a V-shape.

8. A door of claim 6, wherein the slit is formed in a U-shape.

* * * * *